United States Patent
Lo et al.

(10) Patent No.: US 11,764,596 B2
(45) Date of Patent: Sep. 19, 2023

(54) HOT PLUGGING TYPE POWER MODULE

(71) Applicant: PEGATRON CORPORATION, Taipei (TW)

(72) Inventors: Chih-Shen Lo, Taipei (TW); Chia-Lin Wu, Taipei (TW); Chien-Hui Chien, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 95 days.

(21) Appl. No.: 17/505,499

(22) Filed: Oct. 19, 2021

(65) Prior Publication Data

US 2022/0216713 A1 Jul. 7, 2022

(30) Foreign Application Priority Data

Jan. 5, 2021 (TW) .................................. 110100289

(51) Int. Cl.
*H02J 7/00* (2006.01)
*H01R 13/627* (2006.01)
*H01R 12/70* (2011.01)

(52) U.S. Cl.
CPC ........ *H02J 7/0063* (2013.01); *H01R 12/7076* (2013.01); *H01R 12/7088* (2013.01); *H01R 13/6275* (2013.01); *H02J 7/0013* (2013.01); *H01R 12/7082* (2013.01)

(58) Field of Classification Search
CPC ............ H01R 12/7082; H01R 13/6275; H01R 12/7088; H01R 12/7076; H02J 7/0013; H02J 7/0063
USPC .......................................................... 307/19
See application file for complete search history.

(56) References Cited

U.S. PATENT DOCUMENTS

| 10,283,975 B1 * | 5/2019 | Venkatasamy ........ H02J 7/0048 |
| 2015/0303695 A1 * | 10/2015 | Perry .................. H01M 10/482 |
| | | 307/80 |

FOREIGN PATENT DOCUMENTS

| TW | I603564 | 10/2017 |
| TW | I614970 | 2/2018 |

* cited by examiner

*Primary Examiner* — Michael R. Fin
(74) *Attorney, Agent, or Firm* — J.C. PATENTS

(57) ABSTRACT

A hot plugging type power module including a circuit board, a main battery, an assistant battery, a main control unit, and a detection unit is provided. The main battery is demountably disposed at the circuit board and coupled to the main control unit. The assistant battery is disposed at the circuit board. The main control unit is disposed at the circuit board and selectively and electrically connected to the main battery and the assistant battery. The main control unit detects a capacity of the main battery and the assistant battery. The detection unit is disposed at the circuit board and coupled to the main control unit and the main battery and is adapted for detecting a relative position between the main battery and the circuit board.

8 Claims, 12 Drawing Sheets

HOT PLUGGING TYPE POWER MODULE

CROSS-REFERENCE TO RELATED APPLICATION

This application claims the priority benefit of Taiwan application serial no. 110100289, filed on Jan. 5, 2021. The entirety of the above-mentioned patent application is hereby incorporated by reference herein and made a part of this specification.

BACKGROUND

Technical Field

The disclosure relates to a power source module, and in particular to a hot plugging type power module.

Description of Related Art

An existing electronic device has a battery hot plugging function, and an existing technology is to install a super capacity in the electronic device. When a main battery is removed or energy is depleted, the super capacity allows the electronic device to maintain operation in a short period of time to facilitate shutdown or file storage. However, the power storage capacity of the existing super capacity is too small. During use, the electronic device is required to enter a low power consumption mode to facilitate the aforementioned simple operation. Since the power storage capacity of the super capacity is not enough to maintain the normal operation of the electronic device, a user needs to suspend the operation of the electronic device until the main battery is charged and reinstalled or until the electronic device is connected to the supply mains through a transformer.

When the electronic device is used outdoors and the main battery capacity is depleted, the electronic device cannot operate normally, so there exists a disadvantage of insufficient battery life.

SUMMARY

The disclosure provides a hot plugging type power module, which is adapted for being coupled to and supplying power to an electronic device. When a main battery is removed or a capacity of the main battery is less than a preset value, an assistant battery is directly activated to supply power to maintain the normal operation of the electronic device, and there is no need for the electronic device to enter a low power consumption mode.

A hot plugging type power module of the disclosure is coupled to an electronic device. The hot plugging type power module includes a circuit board, a main control unit, a main battery, an assistant battery, and a detection unit. The main control unit is disposed at the circuit board. The main battery is demountably disposed at the circuit board. The assistant battery is disposed at the circuit board. The main control unit is disposed at the circuit board and selectively and electrically connected to the main battery or the assistant battery. The main control unit detects a capacity of the main battery and a capacity of the assistant battery. The detection unit is disposed at the circuit board and is coupled to the main control unit and the main battery to detect a relative position between the main battery and the circuit board. When the main control unit detects that the capacity of the main battery is less than a first preset value or the detection unit detects that the relative position between the main battery and the circuit board changes, the main control unit turns off the main battery and stops the main battery from supplying power to the electronic device. The main control unit is switched to be electrically connected to the assistant battery, and the assistant battery supplies power to the electronic device.

In an embodiment of the disclosure, the hot plugging type power module further includes a main switching element and a sub-switching element. The main switching element is coupled to the main battery and the main control unit, and the sub-switching element is coupled to the assistant battery and the main control unit.

In an embodiment of the disclosure, when the capacity of the main battery is less than the first preset value and the capacity of the assistant battery is greater than a second preset value, the main control unit switches the main switching element to a non-conductive state so that the main battery stops supplying power to the electronic device, and switches the sub-switching element to a conductive state so that the assistant battery starts supplying power to the electronic device.

In an embodiment of the disclosure, the main battery includes multiple locking structures and multiple magnets. Each of the locking structures is movably and fittingly connected to the electronic device. Each of the magnets is disposed in each of the locking structures. The detection unit includes at least one Hall sensor. When the locking structures move relative to the circuit board, the at least one Hall sensor detects displacements of the magnets and transmits a switch signal to the main control unit. Accordingly, the main control unit turns off the main battery and stops the main battery from supplying power to the electronic device, and the main control unit is electrically connected to the assistant battery and the assistant battery is used to supply power to the electronic device.

In an embodiment of the disclosure, the main battery has an area of electrical contact. The detection unit has at least one metal elastic sheet. The area of electrical contact is coupled to the detection unit through the at least one metal elastic sheet. When the main battery moves relative to the circuit board to detach the area of electrical contact from the at least one metal elastic sheet, the detection unit outputs a switch signal to the main control unit. Accordingly, the main control unit turns off the main battery and stops the main battery from supplying power to the electronic device, and the main control unit is electrically connected to the assistant battery and the assistant battery is used to supply power to the electronic device.

In an embodiment of the disclosure, the main control unit detects a voltage or current of the main battery and the assistant battery in real time to determine the capacity of the main battery and the assistant battery.

In an embodiment of the disclosure, an operating voltage range of the main battery is the same as an operating voltage range of the assistant battery.

In an embodiment of the disclosure, the hot plugging type power module further includes a charging unit. The charging unit is coupled to the main battery, the assistant battery, and the main control unit. When an operating voltage of the main battery is higher than an operating voltage of the assistant battery, the charging unit reduces the operating voltage of the main battery to charge the assistant battery. When the operating voltage of the main battery is lower than the operating voltage of the assistant battery and the operating voltage of the assistant battery is lower than a maximum value, the charging unit increases the operating voltage of the main battery to charge the assistant battery.

In an embodiment of the disclosure, when the operating voltage of the assistant battery is equal to the maximum value, the main control unit powers off the charging unit, so that the main battery stops outputting current to the assistant battery.

Based on the above, the hot plugging type power module of the disclosure is adapted for all kinds of electronic devices. The hot plugging type power module has a main battery and an assistant battery. The main control unit and the main battery are directly hot-plugged, and the assistant battery is in-built in the circuit board. When the main battery is removed or the capacity is depleted, the main control unit is automatically switched to be electrically connected to the assistant battery to supply power to the electronic device, preventing the electronic device from entering low power consumption mode. Since the power storage capacity of the assistant battery is much larger than the existing super capacity, the assistant battery supplies the electronic device to operate normally for a period of time, thereby overcoming the insufficient battery life of the existing super capacity.

In addition, the disclosure detects the relative position between the main battery and the circuit board through the detection unit, and monitors the capacity of the main battery through the main control unit. When the main battery meets any of the conditions of removal, displacement or the capacity being less than the first preset value, the assistant battery is switched to maintain an uninterruptible power supplying function of the electronic device.

DESCRIPTION OF THE EMBODIMENTS

Figure 1A:
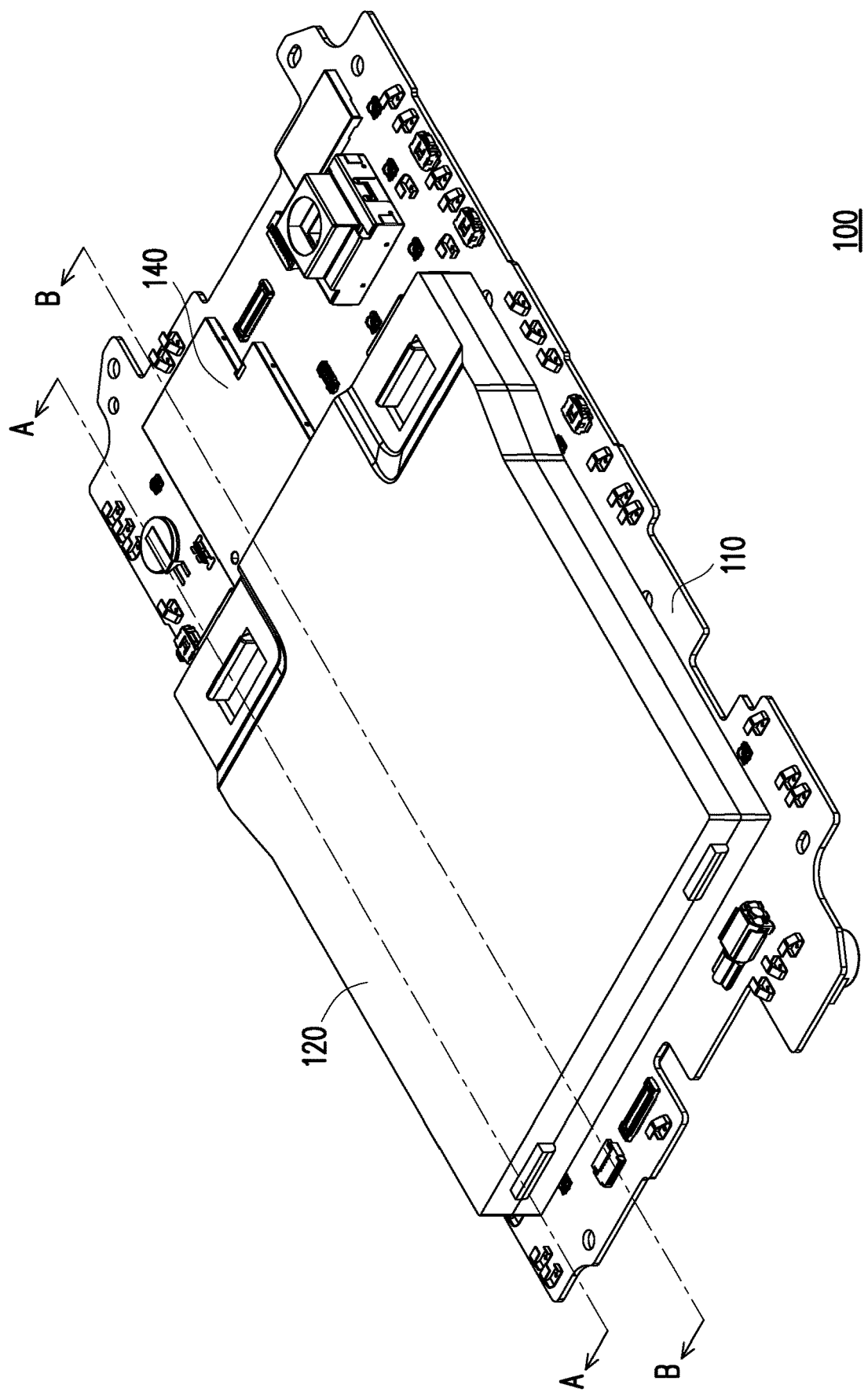
FIG. 1A is a schematic perspective view of a hot plugging type power module according to an embodiment of the disclosure.
Figure 1B:
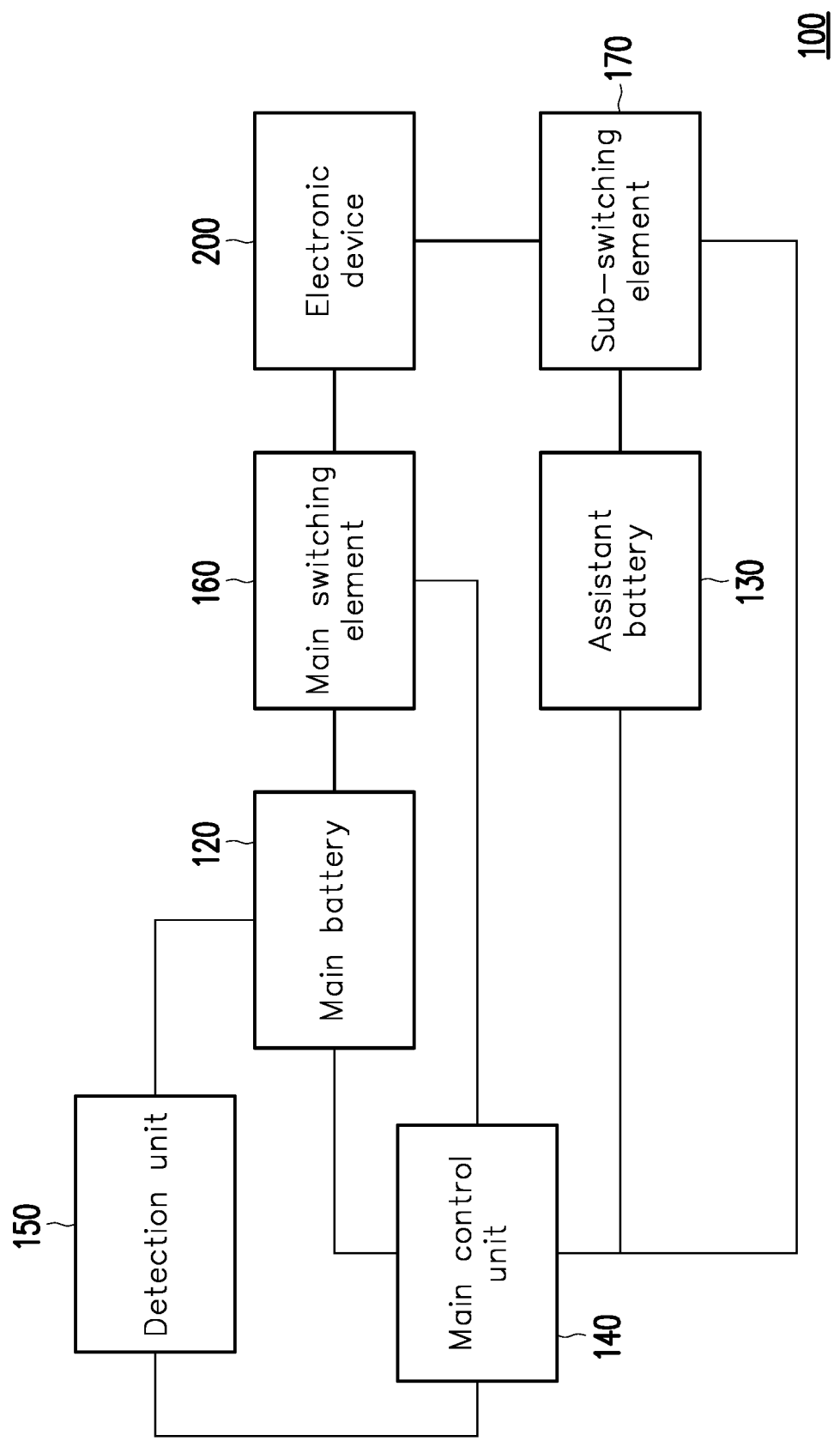
FIG. 1B is a circuit block diagram of the hot plugging type power module of FIG. 1A.

FIG. 1A is a schematic perspective view of a hot plugging type power module according to an embodiment of the disclosure. FIG. 1B is a circuit block diagram of the hot plugging type power module of FIG. 1A.

Referring to FIGS. 1A and 1B, a hot plugging type power module 100 of this embodiment is adapted for being coupled to an electronic device 200, and the electronic device 200 is, for example, a notebook computer, a tablet computer or a similar portable electronic appliance. The hot plugging type power module 100 includes a circuit board 110, a main battery 120, an assistant battery 130, a main control unit 140, and a detection unit 150.

The circuit board 110 is adapted for being installed inside the electronic device 200 to carry various electronic parts.

Referring to FIG. 1B, the main battery 120 is demountably disposed at the circuit board 110. Specifically, the main battery 120 and the circuit board 110 are coupled to each other through corresponding connection ports (not shown in the figure), and the main battery 120 may be directly hot-plugged to be completely separated from the circuit board 110, thereby facilitating replacement of the damaged main battery 120. The assistant battery 130 is disposed at the circuit board 110, and the assistant battery 130 is soldered on the circuit board 110 and cannot be replaced.

In this embodiment, both the main battery 120 and the assistant battery 130 are lithium ion batteries or other types of charge batteries. For example, the total power storage capacity of the main battery 120 and the assistant battery 130 is 5000 mAh, and the power storage capacity of the main battery 120 is 4000 mAh, and the power storage capacity of the assistant battery 130 is 1000 mAh. In other embodiments, the ratio of the power storage capacity of the main battery to the power storage capacity of the assistant battery and the total power storage capacity may be adjusted according to needs. For example, the power storage capacity of the main battery 120 is 3000 mAh, and the power storage capacity of the assistant battery 130 is 2000 mAh, and the total power storage capacity is greater or less than 5000 mAh.

The main control unit 140 is disposed at the circuit board 110 and selectively and electrically connects the main battery 120 or the assistant battery 130 to the electronic device 200. The main control unit 140 may detect the capacity of the main battery 120 and the capacity of the assistant battery 130.

Furthermore, the main control unit 140 adopts, for example, a microcontroller. The function of the main control unit 140 includes the following. The main control unit 140 performs calculation analysis on various electronic signals to determine whether the electronic signals meet preset parameters. If yes, the main control unit 140 triggers corresponding commands and detects various information of the hardware in real time to monitor the operation status thereof. When the hardware generates an error or experiences failure, the issue may be eliminated or the operation may be stopped in real time. At the same time, after determining that the hardware has generated an error or experienced failure, the main control unit 140 may send failure information to a display or activate a buzzer, and may display the failure information through the display or activate the buzzer to generate a warning sound.

In this embodiment, the main control unit 140 detects the voltage, current, or temperature of the main battery 120 and the assistant battery 130 in real time. Here, the main control unit 140 uses a corresponding voltage current sensor and a temperature sensor to derive the above information. The main control unit 140 may determine the capacity level through voltage and current, and switch between modes of the hot plugging type power module 100 supplying power to the electronic device 200. The main control unit 140 may determine the operating status of the main battery 120 and the assistant battery 130 according to temperature. When the temperature is normal, power supply is maintained, and when the temperature is too high, the battery enters a sleep mode to stop the power supply. In short, the main control unit 140 has a function of detecting power storage capacity and temperature, and is used to switch between power supply and power off of the main battery 120 and the assistant battery 130.

Referring to FIGS. 1A and 1B, the detection unit 150 is disposed at the circuit board 110 and is coupled to the main control unit 140 and the main battery 120 to detect the relative position between the main battery 120 and the circuit board 110 and determine whether the main battery 120 is displaced or is to be removed. Before the main battery 120 and the circuit board 110 are disconnected, the assistant battery 130 may be switched to in real time for power supply to avoid power failure of the electronic device 200.

Figure 1C:
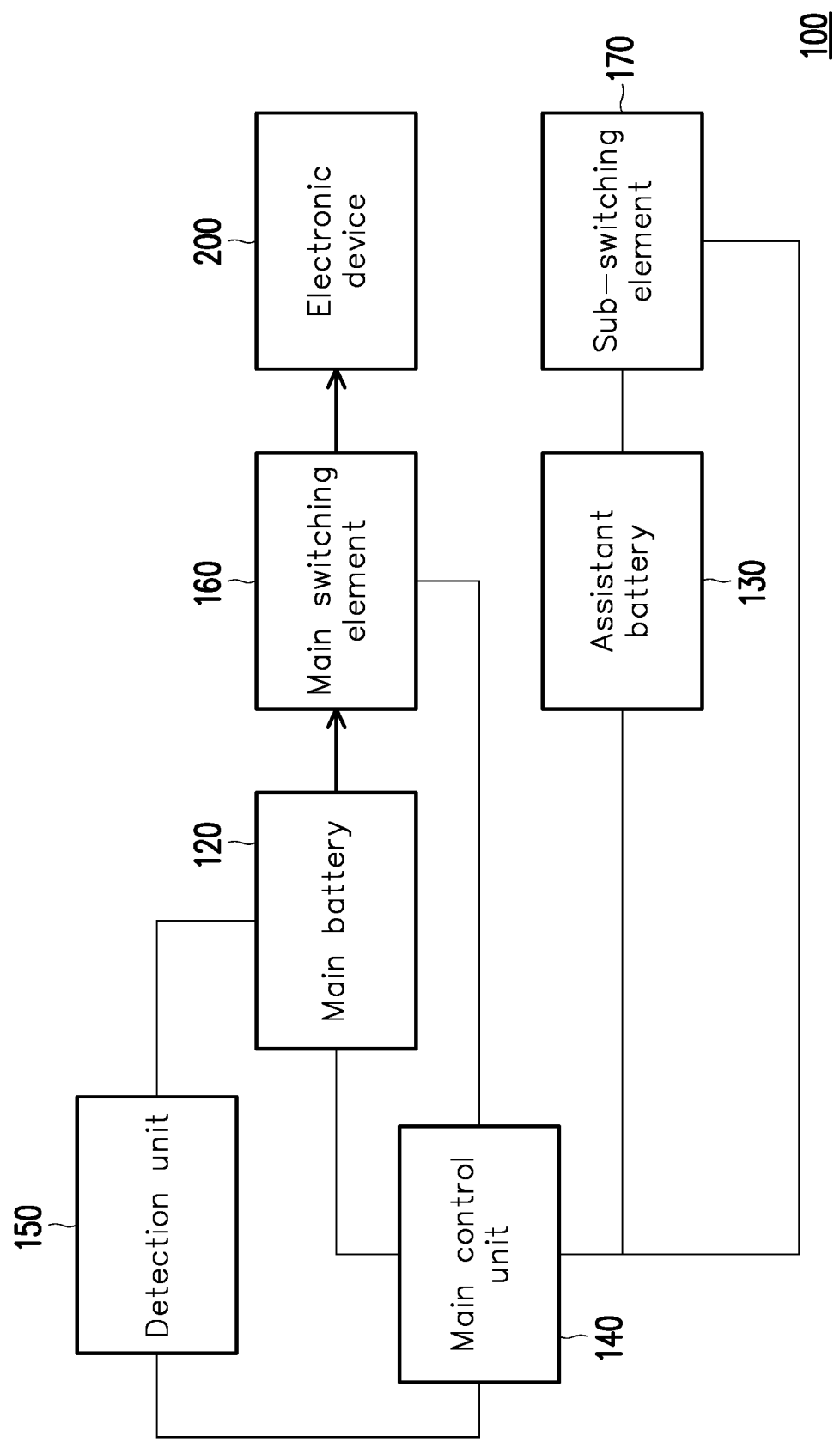
FIG. 1C is a circuit block diagram of the hot plugging type power module of FIG. 1B powered by a main battery.
Figure 1D:
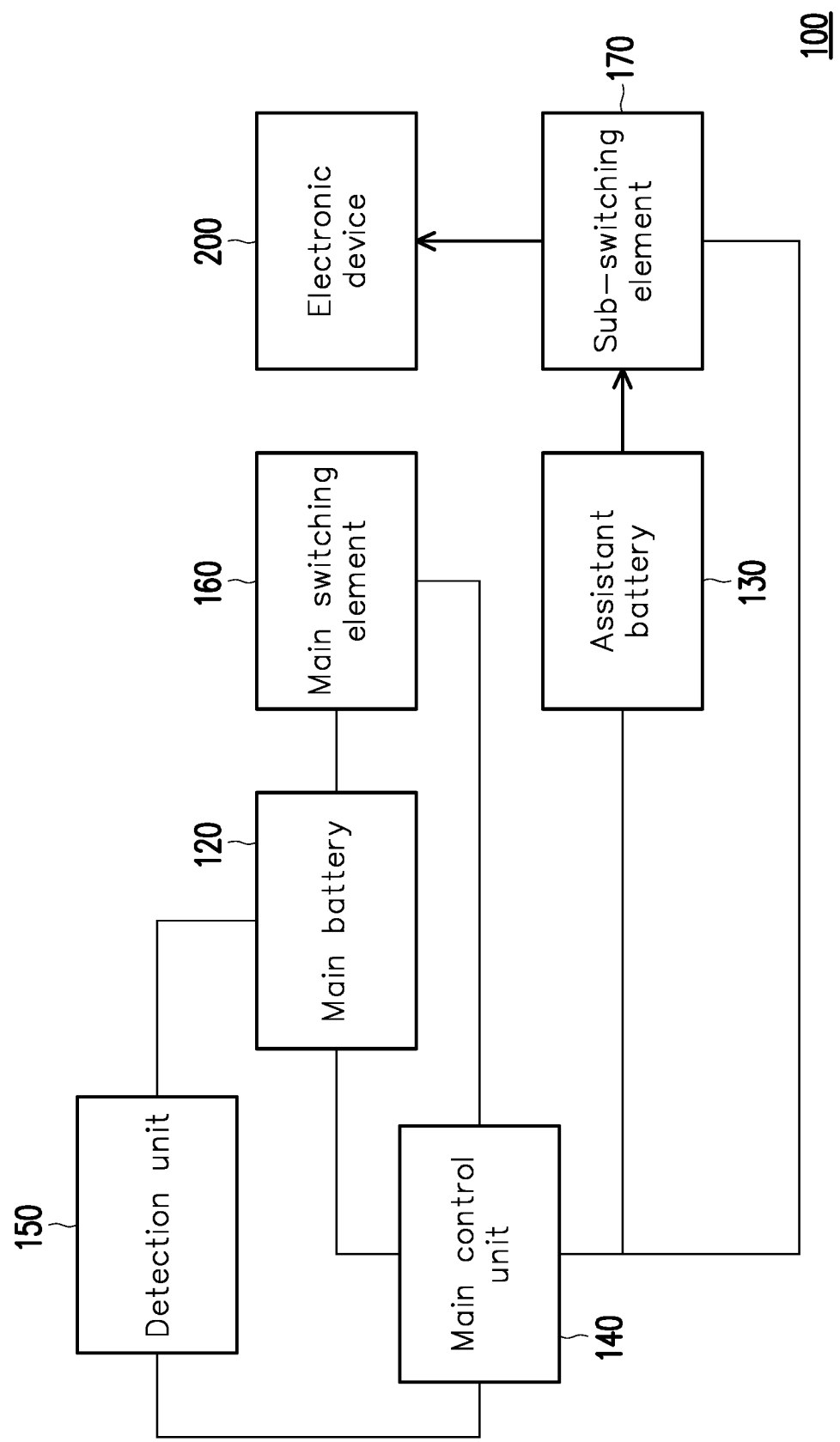
FIG. 1D is a circuit block diagram of the hot plugging type power module of FIG. 1B switching to be powered by an assistant battery.
Figure 1E:
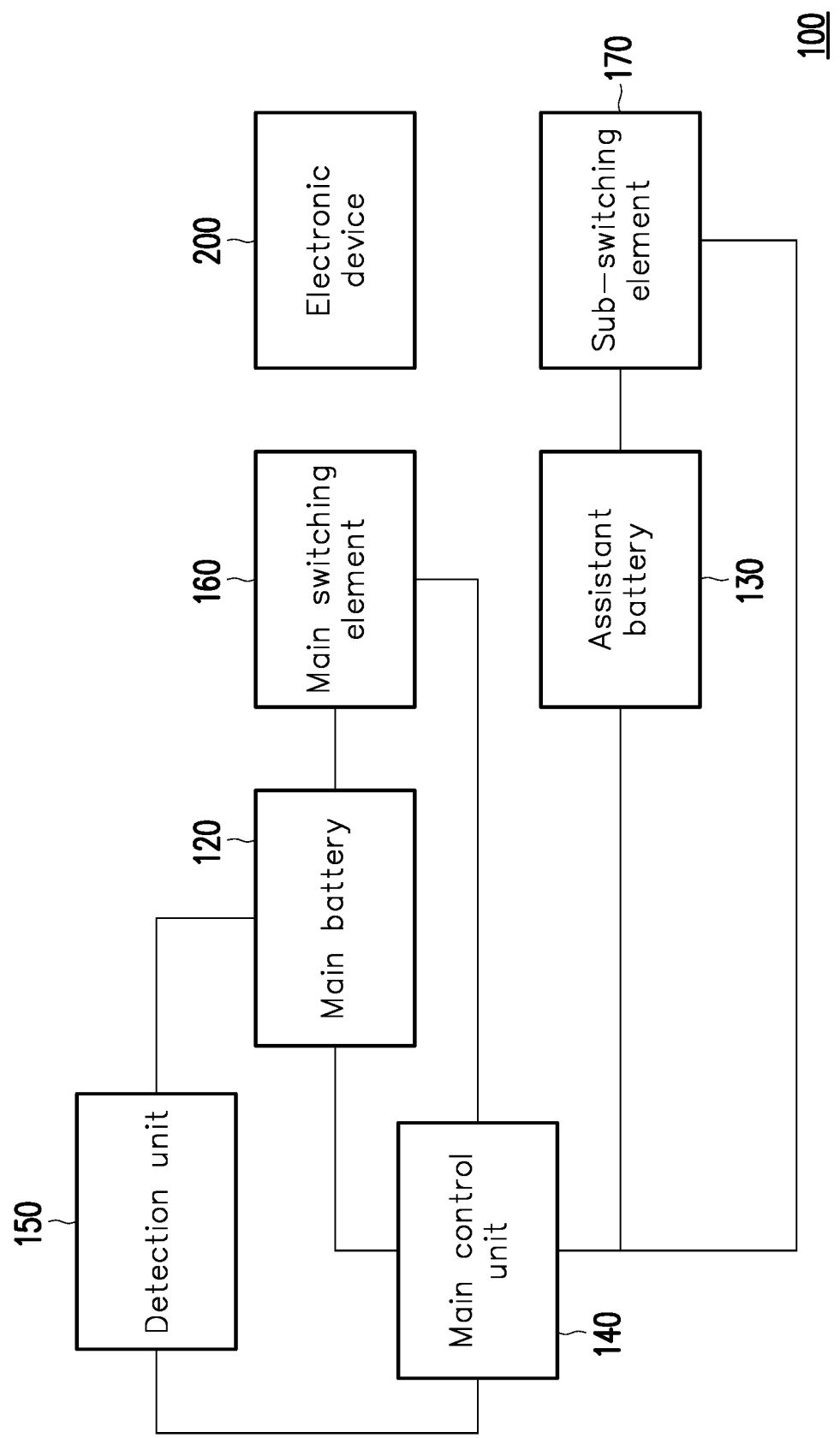
FIG. 1E is a circuit block diagram of the main battery and the assistant battery of the hot plugging type power module of FIG. 1B stopping supplying power.

FIG. 1C is a circuit block diagram of the hot plugging type power module of FIG. 1B powered by the main battery. FIG. 1D is a circuit block diagram of the hot plugging type power module of FIG. 1B switching to be powered by the assistant battery. FIG. 1E is a circuit block diagram of the main battery and the assistant battery of the hot plugging type power module of FIG. 1B stopping supplying power.

Referring to FIG. 1C, when the main control unit 140 detects that the capacity of the main battery 120 is greater than a first preset value (for example, greater than 10% or 20%), the main control unit 140 uses the main battery 120 to supply power to the electronic device 200. At the same time, the main control unit 140 turns off the electrical connection between the assistant battery 130 and the electronic device 200, and switches the assistant battery 130 to a sleep mode.

Furthermore, referring to FIG. 1D, when the main control unit 140 detects that the capacity of the main battery 120 is less than the first preset value (for example, less than 10% or 20%) or the detection unit 150 detects that the relative position between the main battery 120 and the circuit board 110 changes, the main control unit 140 turns off the main battery 120 and stops the main battery 120 from supplying power to the electronic device 200. At the same time, the main control unit 140 switches the assistant battery 130 from the sleep mode to a power supply mode (that is, the main control unit 140 is switched to be electrically connected to the assistant battery 130), and the assistant battery 130 is used to supply power to the electronic device 200.

In other embodiments, the main control unit 140, for example, switches the assistant battery 130 to the power supply mode after the capacity of the main battery 120 is fully depleted.

Referring to FIGS. 1B to 1D, the hot plugging type power module 100 includes a main switching element 160 and a sub-switching element 170. The main switching element 160 is coupled to the main battery 120 and the main control unit 140. The sub-switching element 170 is coupled to the assistant battery 130 and the main control unit 140.

In this embodiment, the main switching element 160 and the sub-switching element 170 adopt, for example, field effect transistors (FETs), which are mainly used for amplification, switching, voltage stabilization, modulation, and other related controls of electrical signals.

Referring to FIG. 1C, when the capacity of the main battery 120 is greater than the first preset value (10% or 20%), the main control unit 140 switches the main switching element 160 to a conductive state so that the main battery 120 starts to supply power to the electronic device 200, and switches the sub-switching element 170 to a non-conductive state.

Referring to FIG. 1D, when the capacity of the main battery 120 is less than the first preset value (10% or 20%) and the capacity of the assistant battery 130 is greater than a second preset value (50% or 60%), the main control unit 140 switches the main switching element 160 to a non-conductive state so that the main battery 120 stops supplying power to the electronic device 200, and switches the sub-switching element 170 to a conductive state so that the assistant battery 130 starts to supply power to the electronic device 200.

Also referring to FIG. 1E, when the capacity of the main battery 120 is less than the first preset value (10% or 20%) and the capacity of the assistant battery 130 is less than the second preset value (50% or 60%), the main control unit 140 switches both the main switching element 160 and the sub-switching element 170 to a non-conductive state to stop supplying power to the electronic device 200. In addition, since neither the main battery 120 nor the assistant battery 130 supplies power to the electronic device 200 in this case, the electronic device 200 is forced to shut down.

FIG. IF is a circuit block diagram of combining a charging unit to the hot plugging type power module of FIG. 1A. FIG. 1G is a circuit block diagram of the hot plugging type power module powering on the charging unit of FIG. 1F. FIG. 1H is a circuit block diagram of the hot plugging type power module powering off the charging unit of FIG. 1F.

Figure 1F:
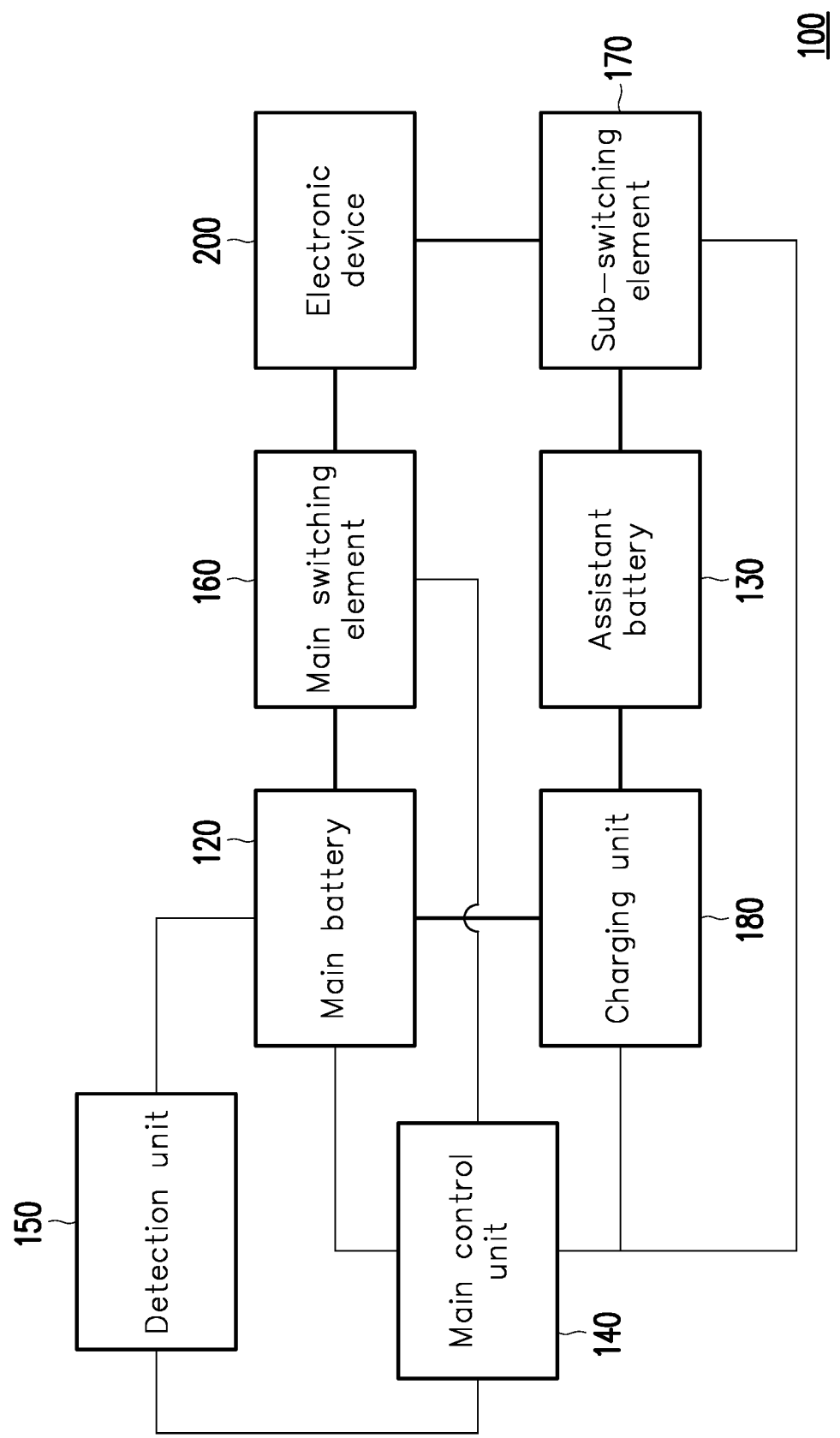
FIG. 1F is a circuit block diagram of combining a charging unit to the hot plugging type power module of FIG. 1A.
Figure 1G:
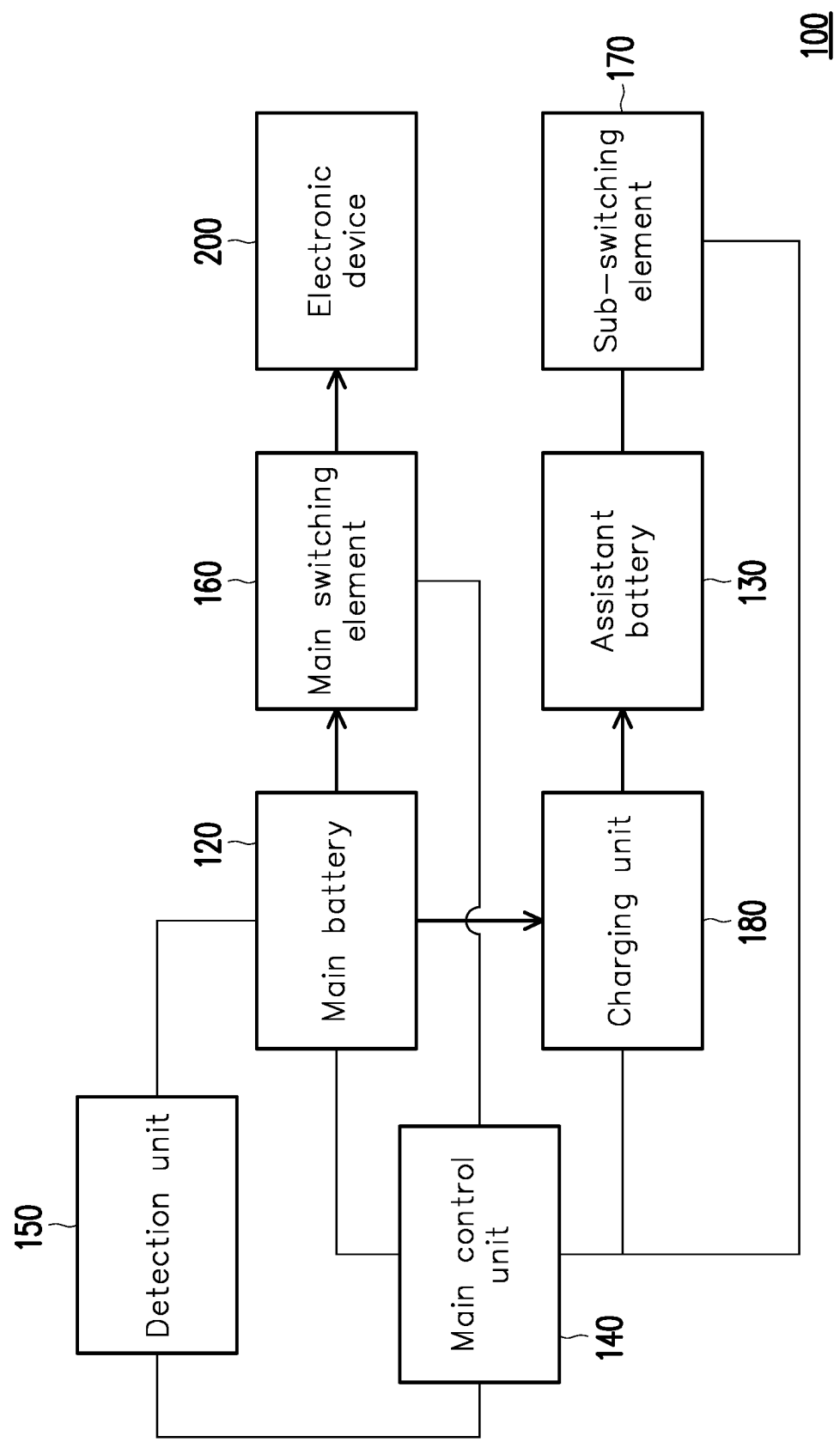
FIG. 1G is a circuit block diagram of the hot plugging type power module powering on the charging unit of FIG. 1F.
Figure 1H:
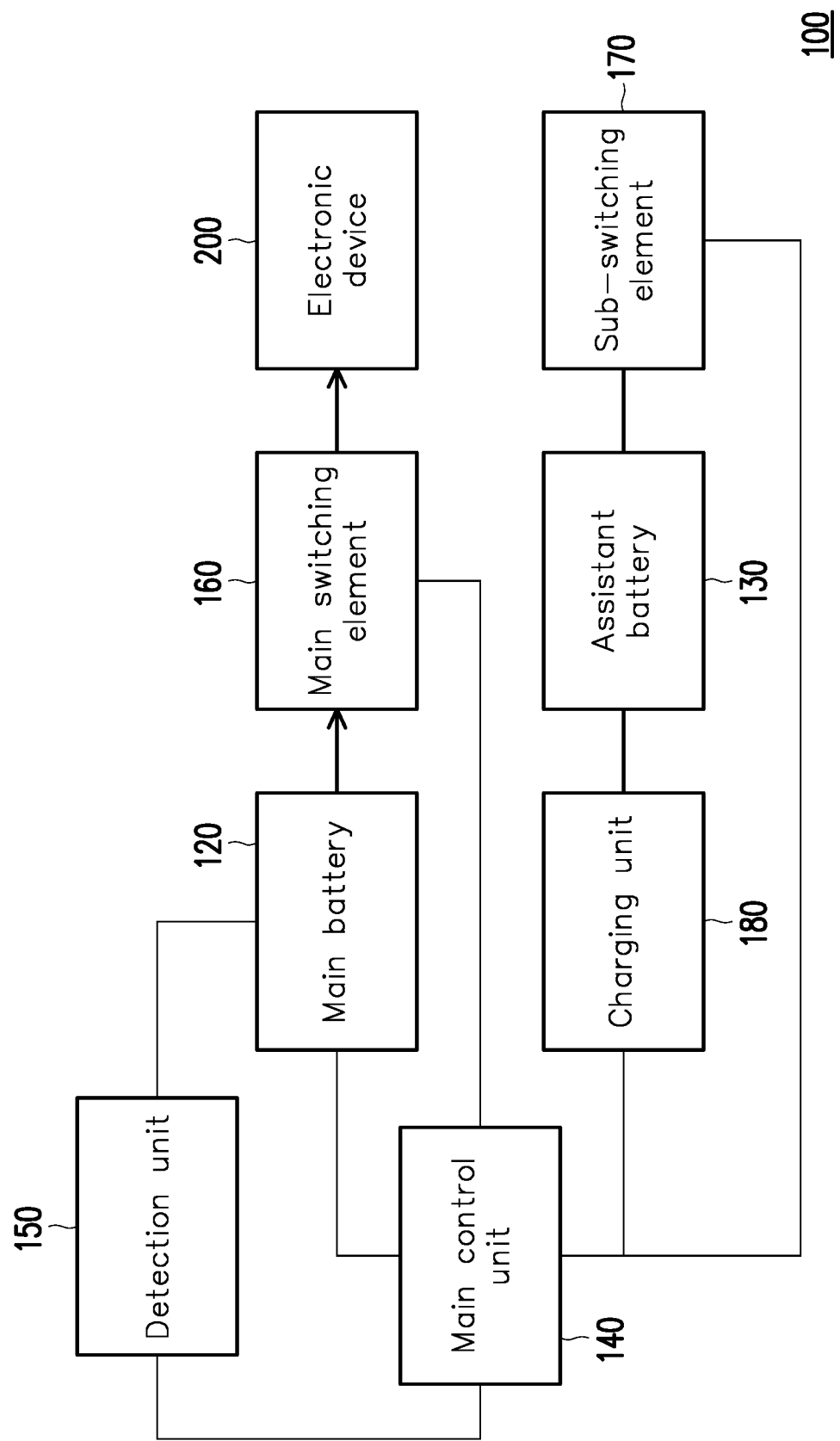
FIG. 1H is a circuit block diagram of the hot plugging type power module powering off the charging unit of FIG. 1F.

Specifically, referring to FIG. 1F, the operating voltage range of the main battery 120 and the operating voltage range of the assistant battery 130 are the same. For example, when the capacity is 100%, the operating voltage is 4.4 volts (V); when the capacity is 50%, the operating voltage is 3.8V; and when the capacity is 0%, the operating voltage is 3.4V.

Referring to FIG. 1F, the hot plugging type power module 100 includes a charging unit 180, and the charging unit 180 is coupled to the main battery 120, the assistant battery 130, and the main control unit 140.

Referring to FIG. 1G, when the operating voltage (4.2V) of the main battery 120 is higher than the operating voltage (3.6V) of the assistant battery 130 and the capacity of the main battery 120 is greater than the first preset value, the main battery 120 maintains the power supply mode and the assistant battery 130 maintains the sleep mode (the main control unit 140 interrupts the current transmission path between the sub-switching element 170 and the electronic device 200) to supply power to the electronic device 200.

Since the operating voltage (3.6V) of the assistant battery 130 is less than a maximum value (4.4V), it means that the capacity of the assistant battery 130 is not full yet. In this case, the main control unit 140 powers on the charging unit 180, so that part of the current of the main battery 120 passes through the charging unit 180 to enter the assistant battery 130 until the operating voltage of the assistant battery 130 is increased to the maximum value. The charging unit 180 may reduce the operating voltage of the main battery 120 to output current to the assistant battery 130. Lowering the operating voltage of the main battery 120 may reduce the damage to the assistant battery 130 during the charging process.

Referring to FIG. 1G, when the operating voltage (3.8V) of the main battery 120 is lower than the operating voltage (4.0V) of the assistant battery 130 and the operating voltage of the assistant battery 130 is lower than the maximum value (4.4V), the charging unit 180 may increase the operating voltage of the main battery 120 to output current to the assistant battery 130. Through the boosting function of the charging unit 180, the main battery 120 may continue to charge the assistant battery 130 under a low-voltage status.

Referring to FIG. 1H, when the operating voltage of the assistant battery 130 is equal to the maximum value (4.4 volts), it means that the capacity of the assistant battery 130 is full. At this time, the main control unit 140 powers off the charging unit 180, so that the main battery 120 stops outputting current to the assistant battery 130 and the main battery 120 maintains the power supply mode.

Figure 2A:
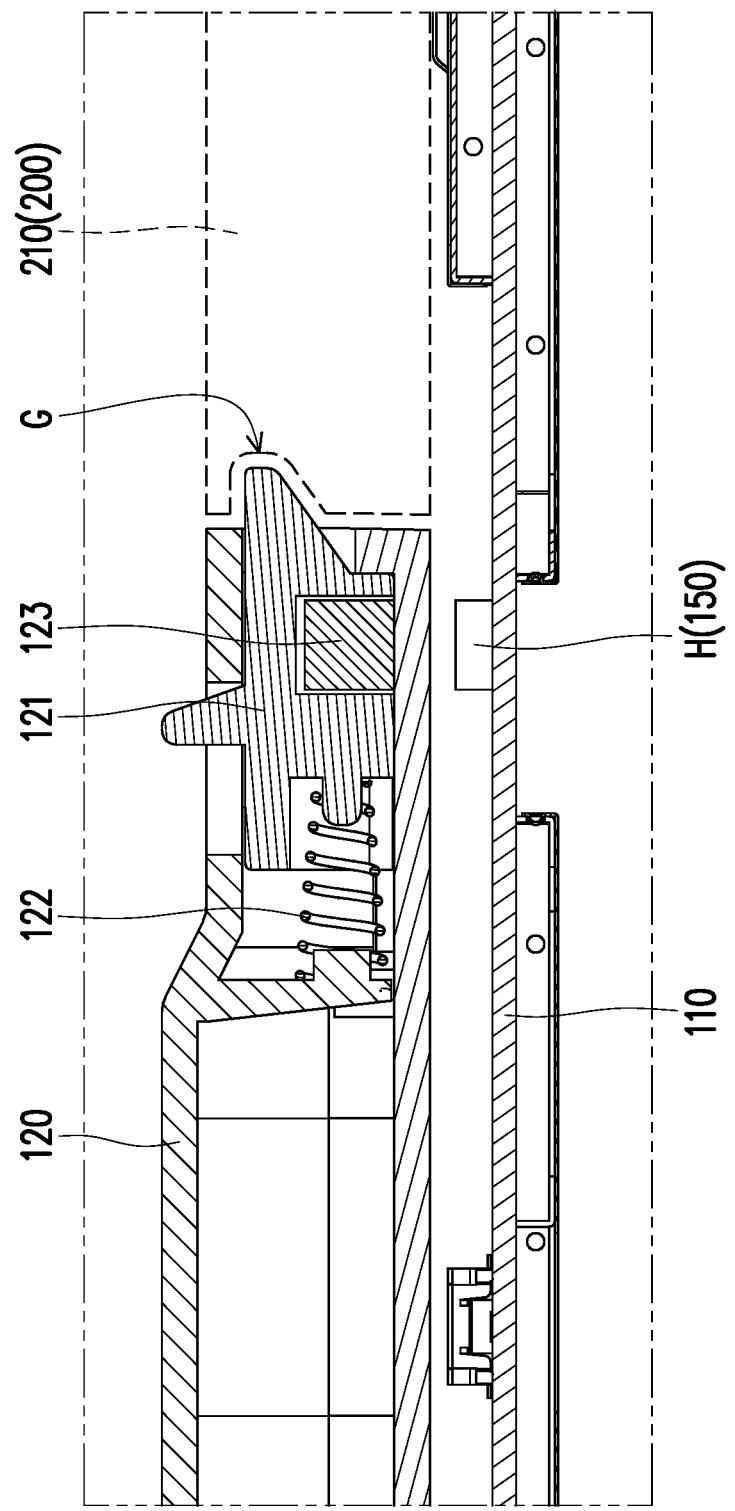
FIG. 2A is a schematic cross-sectional view of the main battery of the hot plugging type power module shown of FIG. 1A locked at a base taken along a sectional line A-A.
Figure 2B:
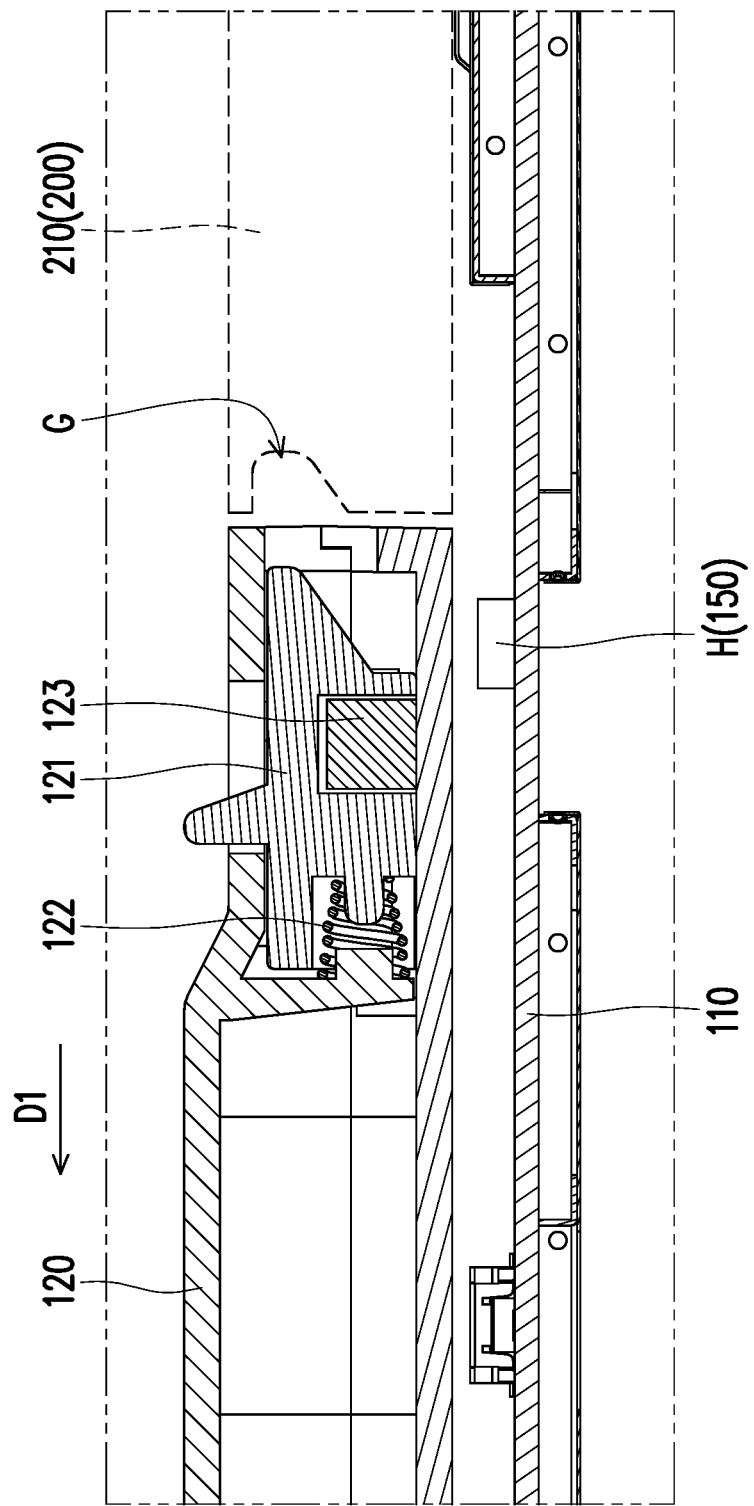
FIG. 2B is a schematic cross-sectional view of the main battery of the hot plugging type power module of FIG. 2A unlocked from the base.

FIG. 2A is a schematic cross-sectional view of the main battery of the hot plugging type power module shown of FIG. 1A locked at a base taken along a sectional line A-A. FIG. 2B is a schematic cross-sectional view of the main battery of the hot plugging type power module of FIG. 2A unlocked from the base.

Referring to FIGS. 1A and 2A, the main battery 120 includes a plurality of locking structures 121, a plurality of elastic members 122, and a plurality of magnets 123. Each locking structure 121 may be movably disposed at a side of the main battery 120 and fittingly connected to a base 210 of the electronic device 200. Two end parts of each elastic member 122 respectively abut against the main battery 120 and each locking structure 121 to provide an elastic force so that the locking structure 121 engages with a groove G of the base 210. Each magnet 123 is disposed in each locking structure 121 and faces the circuit board 110, and each magnet 123 is adapted to move with each locking structure 121. The detection unit 150 includes at least one Hall sensor H disposed at the circuit board 110 and separated from the magnets 123 of the main battery 120.

Referring to FIGS. 1B, 1D, and 2B, in the process of a user removing the main battery 120, in the first step, the user pushes the locking structures 121 of the main battery 120. When the locking structures 121 are unlocked from the base 210, each magnet 123 moves in a first direction along with the locking structures 121. At least one Hall sensor H detects the displacement of the magnets 123 and transmits a switch signal to the main control unit 140. Accordingly, the main control unit 140 turns off the main battery 120 and stops the main battery 120 from supplying power to the electronic device 200. The main control unit 140 is switched to be electrically connected to the assistant battery 130 so that the assistant battery 130 supplies power to the electronic device 200 (see FIG. 1D).

Specifically, at least one Hall sensor H detects the change in the magnetic field to determine the distance of the magnets 123, and then converts the change in the magnetic field into a switch signal and transmits the switch signal to the main control unit 140.

Figure 3A:
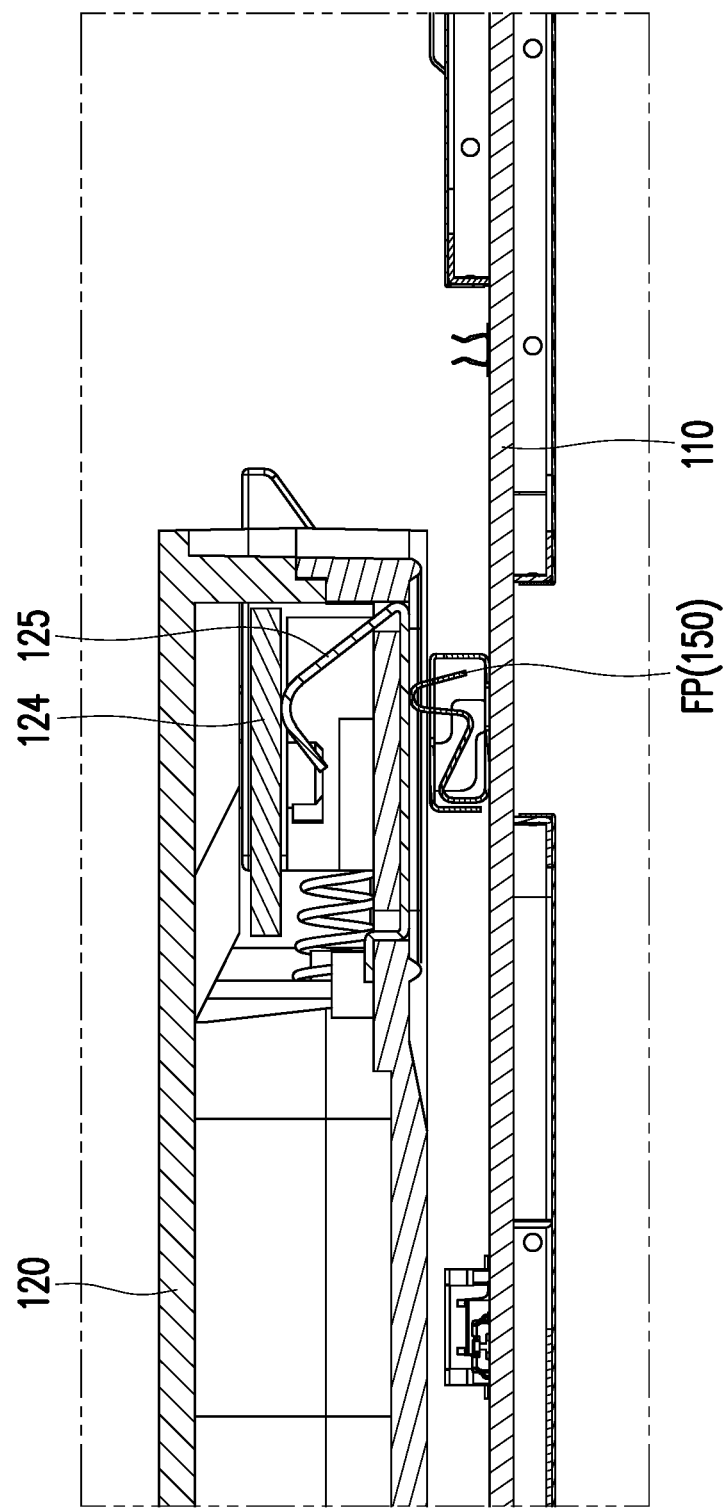
FIG. 3A is a schematic cross-sectional view of the main battery of the hot plugging type power module of FIG. 1A connected to a circuit board taken along a sectional line B-B.
Figure 3B:
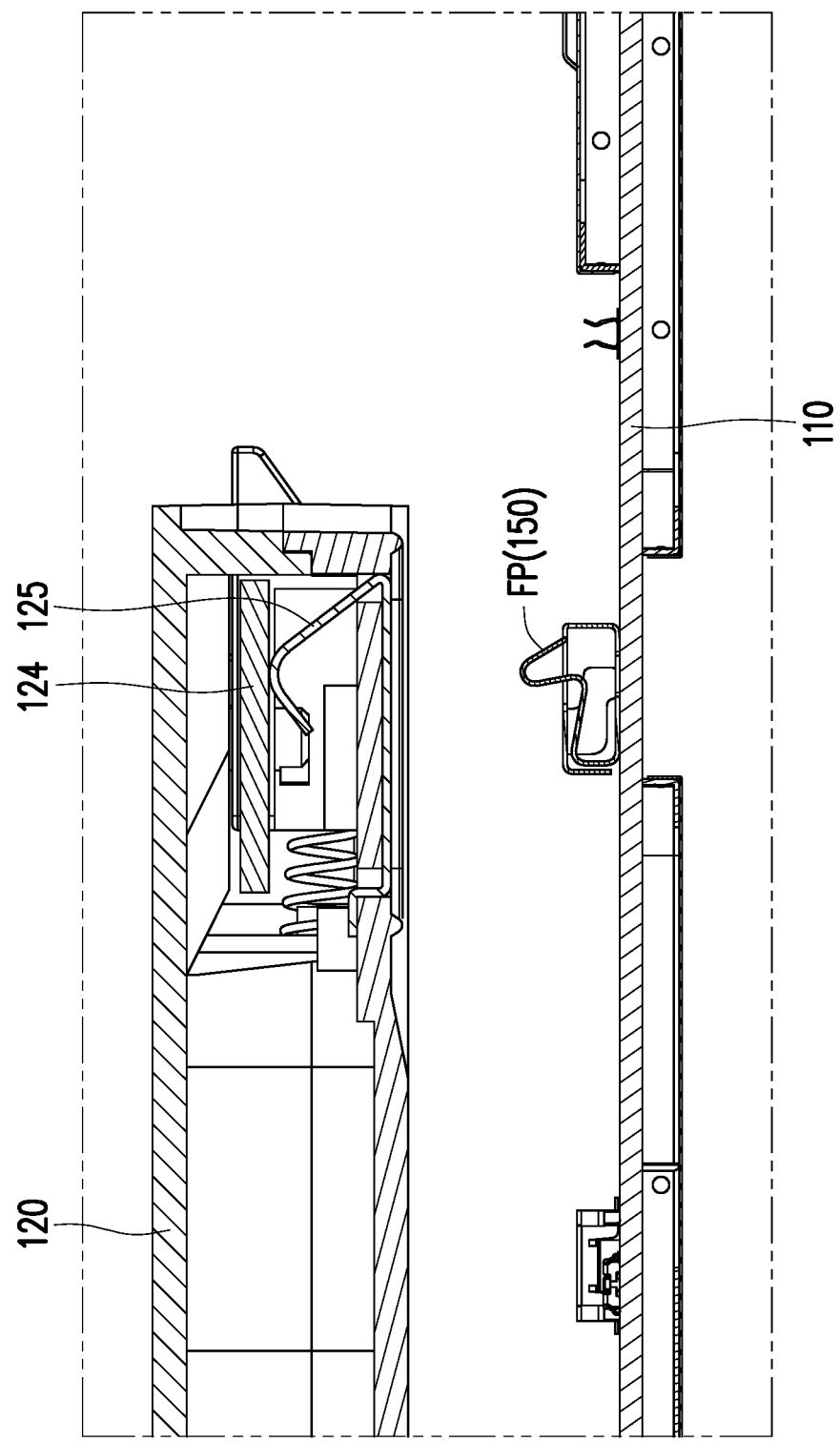
FIG. 3B is a schematic cross-sectional view of the main battery of the hot plugging type power module of FIG. 3A detached from the circuit board.

FIG. 3A is a schematic cross-sectional view of the main battery of the hot plugging type power module of FIG. 1A connected to a circuit board taken along a sectional line B-B. FIG. 3B is a schematic cross-sectional view of the main battery of the hot plugging type power module of FIG. 3A detached from the circuit board.

Referring to FIGS. 1B and 3A, the main battery 120 has an area of electrical contact 124 and at least one metal strip 125. The area of electrical contact 124 may be coupled to the detection unit 150 through at least one metal elastic sheet FP and the area of the electrical contact 124 is coupled to the main control unit 140, and at least one metal strip 125 is coupled to the area of electrical contact 124. The detection unit 150 has at least one metal elastic sheet FP disposed at the circuit board 110 and in contact with at least one metal strip 125.

When the main battery 120 is correctly installed on the circuit board 110, at least one metal elastic sheet FP is in contact with at least one metal strip 125. The main control unit 140 detects that there is a conductive state between the area of electrical contact 124 and the at least one metal elastic sheet FP, so the main battery 120 maintains the power supply mode.

Referring to FIG. 3B, when the main battery 120 is moved or removed relative from the circuit board 110, the area of electrical contact 124 and the at least one metal strip 125 are detached from the at least one metal elastic sheet FP. The detection unit 150 outputs a switch signal to the main control unit 140, and the main control unit 140 detects that there is a non-conductive state between at least one area of electrical contact 124 and the at least one metal elastic sheet FP. Accordingly, the main control unit 140 turns off the main battery 120 and stops the main battery 120 from supplying power to the electronic device 200. The main control unit 140 is electrically connected to the assistant battery 130 and the assistant battery 130 supplies power to the electronic device 200.

In short, when the main battery 120 is moved or removed from the circuit board 110, the electrical connection between the at least one metal elastic sheet FP and the at least one metal strip 125 are turned off earlier than the electrical connection between the main battery 120 and the circuit board 110. Therefore, the main control unit 140 may switch to the assistant battery 130 to supply power in real time before a non-conductive state is formed between the main battery 120 and the circuit board 110, so as to avoid power failure of the electronic device 200.

In addition, the detection unit 150 of the disclosure may detect the unlocking action of the locking structure 121 through the Hall sensor H, or the detaching action of the main battery 120 and the circuit board 110 through the metal elastic sheet FP. In terms of working sequence, the Hall sensor H works before the metal elastic sheet FP; that is, when the main battery 120 is removed, the locking structure 121 is first pushed for unlocking, and then the main battery 120 is removed from the circuit board 110.

In summary, the hot plugging type power module of the disclosure is adapted for all kinds of electronic devices. The hot plugging type power module has a main battery and an assistant battery. The main control unit and the main battery may be directly hot-plugged, and the assistant battery is in-built in the circuit board. When the main battery is removed or the capacity is depleted, the main control unit automatically switches the assistant battery to the power supply mode to supply power to the electronic device, preventing the electronic device from entering low power consumption mode. Since the power storage capacity of the assistant battery is much larger than the existing super capacity, the assistant battery may supply the electronic device to operate normally for a period of time, thereby overcoming the insufficient battery life of the existing super capacity.

In addition, the disclosure detects changes in the relative position between the main battery and the circuit board through the detection unit, and monitors the capacity of the main battery through the main control unit. When the main battery meets any of the conditions of removal, displacement or capacity depletion, the assistant battery may be immediately switched to supply power to maintain an uninterruptible power supplying function of the electronic device.

What is claimed is:

1. A hot plugging type power module, coupled to an electronic device, comprising:
   a circuit board;
   a main battery, demountably disposed at the circuit board;
   an assistant battery, disposed at the circuit board;
   a main control unit, disposed at the circuit board, selectively and electrically connected to the main battery or the assistant battery, wherein the main control unit detects a capacity of the main battery and a capacity of the assistant battery; and
   a detection unit, disposed at the circuit board, coupled to the main control unit and the main battery, adapted for detecting a relative position between the main battery and the circuit board,
   wherein, when the main control unit detects that the capacity of the main battery is less than a first preset value or the detection unit detects that the relative position between the main battery and the circuit board changes, the main control unit turns off the main battery and stops the main battery from supplying power to the electronic device, and the main control unit is switched to be electrically connected to the assistant battery and the assistant battery supplies power to the electronic device,
   wherein, the main battery comprises a plurality of locking structures and a plurality of magnets, each of the locking structures is movably and fittingly connected to the electronic device, each of the magnets is disposed in each of the locking structures, and the detection unit comprises at least one Hall sensor, when the locking structures move relative to the circuit board, the at least one Hall sensor detects displacements of the magnets and transmits a switch signal to the main control unit, the main control unit accordingly turns off the main battery and stops the main battery from supplying power to the electronic device, and the main control unit is electrically connected to the assistant battery and the assistant battery is used to supply power to the electronic device.

2. The hot plugging type power module according to claim 1, further comprising a main switching element and a sub-switching element, wherein the main switching element is coupled to the main battery and the main control unit, and the sub-switching element is coupled to the assistant battery and the main control unit.

3. The hot plugging type power module according to claim 2, wherein when the capacity of the main battery is less than the first preset value and the capacity of the assistant battery is greater than a second preset value, the main control unit switches the main switching element to a non-conductive state so that the main battery stops supplying power to the electronic device, and switches the sub-switching element to a conductive state so that the assistant battery starts supplying power to the electronic device.

4. The hot plugging type power module according to claim 1, wherein the main control unit detects a voltage or current of the main battery and the assistant battery in real time to determine the capacity of the main battery and the assistant battery.

5. The hot plugging type power module according to claim 4, wherein an operating voltage range of the main battery is the same as an operating voltage range of the assistant battery.

6. A hot plugging type power module, coupled to an electronic device, comprising:
   a circuit board;
   a main battery, demountably disposed at the circuit board;
   an assistant battery, disposed at the circuit board;
   a main control unit, disposed at the circuit board, selectively and electrically connected to the main battery or the assistant battery, wherein the main control unit detects a capacity of the main battery and a capacity of the assistant battery;
   a detection unit, disposed at the circuit board, coupled to the main control unit and the main battery, adapted for detecting a relative position between the main battery and the circuit board; and
   a charging unit coupled to the main battery, the assistant battery, and the main control unit, wherein the main control unit is adapted for controlling the charging unit, when the main control unit determines that an operating voltage of the main battery is higher than an operating voltage of the assistant battery, the charging unit reduces the operating voltage of the main battery to charge the assistant battery, and when the main control unit determines that the operating voltage of the main battery is lower than the operating voltage of the assistant battery and the operating voltage of the assistant battery is lower than a maximum value, the charging unit increases the operating voltage of the main battery to charge the assistant battery,
   wherein, when the main control unit detects that the capacity of the main battery is less than a first preset value or the detection unit detects that the relative position between the main battery and the circuit board changes, the main control unit turns off the main battery and stops the main battery from supplying power to the electronic device, and the main control unit is switched to be electrically connected to the assistant battery and the assistant battery supplies power to the electronic device.

7. The hot plugging type power module according to claim 6, wherein when the main control unit determines that the operating voltage of the assistant battery is equal to the maximum value, the main control unit powers off the charging unit, so that the main battery stops outputting current to the assistant battery.

8. A hot plugging type power module, coupled to an electronic device, comprising:
   a circuit board;
   a main battery, demountably disposed at the circuit board;
   an assistant battery, disposed at the circuit board;
   a main control unit, disposed at the circuit board, selectively and electrically connected to the main battery or the assistant battery, wherein the main control unit detects a capacity of the main battery and a capacity of the assistant battery; and
   a detection unit, disposed at the circuit board, coupled to the main control unit and the main battery, adapted for detecting a relative position between the main battery and the circuit board,
   wherein, when the main control unit detects that the capacity of the main battery is less than a first preset value or the detection unit detects that the relative position between the main battery and the circuit board changes, the main control unit turns off the main battery and stops the main battery from supplying power to the electronic device, and the main control unit is switched to be electrically connected to the assistant battery and the assistant battery supplies power to the electronic device, wherein the main battery has an area of electrical contact, the detection unit has at least one metal elastic sheet, and the area of electrical contact is coupled to the detection unit through the at least one metal elastic sheet, when the main battery moves relative to the circuit board to detach the area of electrical contact from the at least one metal elastic sheet, the detection unit outputs a switch signal to the main control unit, the main control unit accordingly turns off the main battery and stops the main battery from supplying power to the electronic device, and the main control unit is electrically connected to the assistant battery and the assistant battery is used to supply power to the electronic device.

* * * * *